Figure 1:
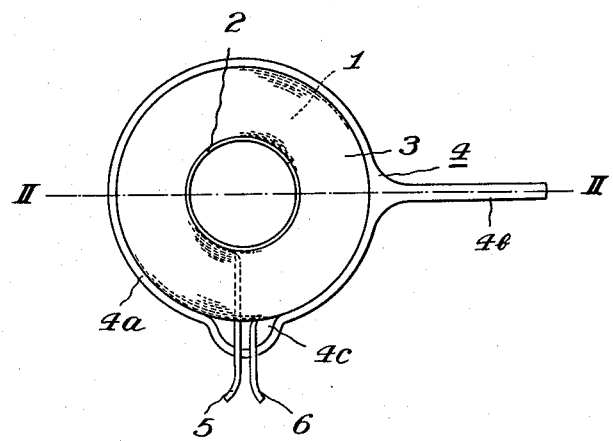

July 28, 1964  KENKICHI TSUKAMOTO  3,142,786
MINIATURIZED ALUMINUM MOVABLE COIL
Filed Dec. 9, 1960

Kenkichi Tsukamoto
Inventor
by George B. Oujevolk
Attorney

United States Patent Office 3,142,786
Patented July 28, 1964

3,142,786
MINIATURIZED ALUMINUM MOVABLE COIL
Kenkichi Tsukamoto, 47 Koyamashimofusa-cho,
Kita-ku, Kyoto-shi, Japan
Filed Dec. 9, 1960, Ser. No. 74,967
1 Claim. (Cl. 317—158)

This invention relates to moving coils for electrical use, and more particularly it relates to a new and improved moving coil of the type wherein aluminum ribbon wire is used.

In the case of conventional moving coils of this type wherein aluminum ribbon wire is used, it has been the practice, prior to winding the coil, to provide the aluminum ribbon wire with an insulation covering of thermosetting resin or to wind the coil while coating the wire, immediately prior to its being wound, with an insulation agent in paint form and then to set the insulation by baking the moving coil. By this conventional method, however, the thickness of the insulation cover of thermosetting resin or the thickness of the coating of insulation agent cannot be neglected and may become problematical. Accordingly, the width or thickness of the aluminum ribbon wire which could be used has been limited as a natural consequence.

It is an essential object of the present invention, therefore, to provide a new and improved moving coil wherein the above-mentioned disadvantage is eliminated, the coil winding wire is provided with an insulation covering of almost negligible thickness, and the coil may be wound with aluminum ribbon wire of cross-sectional dimensions of the order of 10 microns x 100 microns, whereby substantial miniaturization of the moving coil becomes possible.

It is another object of the invention to provide a moving coil as stated above wherein the value of resonance is low because of the substantial internal loss relative to the vibration of the entire moving coil, whereby it is excellent particularly as a moving coil for electrical sound devices.

It is yet another object of the invention to provide a moving coil, as described above, having simple construction which is readily adaptable to mass-production.

It is a further object of the invention to provide a moving coil, as described above, provided with a new and improved supporting member.

The foregoing objects, other objects, and advantages have been achieved by the moving coil of the present invention, wherein, in view of the fact that the voltage which is imparted between the mutually adjacent layers of windings of a moving coil is infinitesimally low, the aluminum ribbon wire of the winding is made to provide with an insulative film of almost negligible thickness by anode oxidation of the surface of said aluminum ribbon wire.

According to the above-mentioned coil of the present invention, since layers of bonding agent are not particularly disposed between mutually adjacent windings, the space factor of the coil is practically one (unity). Furthermore, since only the outer surface of the moving coil is covered by the bonding agent, a certain amount of space exists between the mutually adjacent layers, whereby frictional loss exists in the contact surface between the said layers, and the internal loss with respect to the vibration of the entire moving coil is large. Accordingly the Q value of resonance is low.

Figure 2:
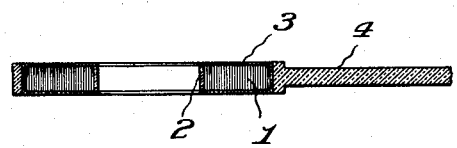

The details of the invention will be more clearly apparent from a consideration of the following description, take in conjunction with the accompanying drawing in which:

FIG. 1 is a plan view showing a spiral-wound moving coil as one embodiment of the present invention; and
FIG. 2 is an elevational view of the coil of FIG. 1, in section along the line II—II.

Referring to FIGS. 1 and 2, the moving coil 1 consists of extremely narrow and thin aluminum ribbon wire, which has been subjected to treatment by anode oxidation, wound in spiral form around the outer periphery of a frame 2; a covering 3 of a bonding agent painted on the outer surface of the moving coil; and lead wires 5 and 6 for electrical connection of the moving coil. The coil assembly is provided with a supporting member 4 which consists of a ring part 4a surrounding the outer periphery of the coil assembly and having a projecting portion 4c for forming a gap adapted to lead out the lead wires 5 and 6, and an extending arm 4b. Such a supporting member 4 as described above can support, in a simple and sure manner, the thin and small moving coil of this invention. Accordingly, the coil assembly including the supporting member 4 is particularly applicable for electrical sound devices. The frame 2 may be withdrawn afterwards.

The coil assembly of this invention is provided with suitable rigidity and strength by the convering 3 of the bonding agent and the special supporting member 4.

In the fabrication of the moving coil described above, it is necessary merely to coat the outer surface thereof after it has been wound. This process, therefore, is much easier than that of the conventional moving coil wherein the coil is wound as its enamel-covered, round-section copper wire is painted with a bonding agent. The moving coil of the present invention has the further advantage in that, unlike the conventional moving coil wound from enamel-covered, round-section copper wire, the gaps within the coil are not large, and there is little possibility of the bonding agent infiltrating thoroughly into the interior to cause excessive hardening of the coil; accordingly, the special characteristic of high internal loss is not impaired.

While I have described particular embodiment of my invention, it will, of course, be understood that I do not wish my invention to be limited thereto, since modifications may be made and I, therefore, contemplate by the appended claim to cover all such modifications as fall within the true spirit and scope of my invention.

What I claim is:

A moving coil arrangement made of concentrically wound aluminum wire, the cross-sectional dimensions of said wire being of the order of 10 microns x 100 microns, said wire having on the outer surface thereof an anode oxidation coating forming an electro-insulative film on said surface, a bonding agent covering disposed over the outer surface of said moving coil, and a supporting member therefor having a ring portion surrounding the outer periphery of said coil and an extending arm.

References Cited in the file of this patent

UNITED STATES PATENTS

| | | |
|---|---|---|
| 2,393,439 | White et al. | Jan. 22, 1946 |
| 2,550,592 | Pearce | Apr. 24, 1951 |
| 2,593,922 | Robinson | Apr. 22, 1952 |
| 2,751,666 | Gallee | June 26, 1956 |
| 2,893,651 | Singleman | July 7, 1959 |
| 2,913,640 | Edgarton | Nov. 17, 1959 |

FOREIGN PATENTS

| | | |
|---|---|---|
| 525,847 | Canada | June 5, 1956 |